United States Patent
Tomioka

(10) Patent No.: US 10,830,860 B2
(45) Date of Patent: Nov. 10, 2020

(54) ELECTRONIC APPARATUS, WIRELESS RECEPTION METHOD, AND WIRELESS SYSTEM

(71) Applicant: KABUSHIKI KAISHA TOSHIBA, Tokyo (JP)

(72) Inventor: Tazuko Tomioka, Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 302 days.

(21) Appl. No.: 15/907,466

(22) Filed: Feb. 28, 2018

(65) Prior Publication Data
US 2019/0113595 A1    Apr. 18, 2019

(30) Foreign Application Priority Data

Oct. 17, 2017   (JP) ................... 2017-201161

(51) Int. Cl.
*G01S 1/04* (2006.01)
*G01S 5/02* (2010.01)
*G01S 11/06* (2006.01)

(52) U.S. Cl.
CPC ............ *G01S 1/045* (2013.01); *G01S 5/0215* (2013.01); *G01S 11/06* (2013.01)

(58) Field of Classification Search
CPC combination set(s) only.
See application file for complete search history.

(56) References Cited

U.S. PATENT DOCUMENTS

| 2009/0121867 | A1* | 5/2009 | Park | G01S 5/0252 340/539.32 |
| 2010/0315289 | A1 | 12/2010 | Nurmela et al. | |
| 2011/0287778 | A1* | 11/2011 | Levin | G01S 5/0252 455/456.1 |
| 2015/0256972 | A1* | 9/2015 | Markhovsky | G01S 5/0215 455/456.1 |
| 2017/0205492 | A1* | 7/2017 | Jacklin | G01S 5/0273 |
| 2017/0310376 | A1* | 10/2017 | Jarmyr | H04B 7/0417 |
| 2017/0331670 | A1* | 11/2017 | Parkvall | H04W 52/0229 |
| 2018/0026481 | A1* | 1/2018 | Ku | H04L 27/2614 370/329 |
| 2018/0183509 | A1* | 6/2018 | Luo | H04B 7/0874 |

FOREIGN PATENT DOCUMENTS

JP    2010-066235 A    3/2010

OTHER PUBLICATIONS

Cihan Tepedelenlioglu, et. al.: "The Ricean K Factor: Estimation and Performance Analysis", IEEE Transactions on Wireless Communications, vol. 2, No. 4, pp. 799-810, Jul. 2003.

Masayuki Ono, et. al.: "Position Detection Using Radio", OKI Technical Review, vol. 72, No. 4, pp. 24-27, Oct. 2005 and its English translation thereof.

* cited by examiner

*Primary Examiner* — Mamadou L Diallo

(74) *Attorney, Agent, or Firm* — Foley & Lardner LLP

(57) ABSTRACT

According to one embodiment, a wireless receiver includes reception circuitry and processor circuitry. The reception circuitry receives a radio wave from a radio wave emitter. The processor circuitry estimates a parameter of a ratio of a first received power of a line-of-sight component in the radio wave to a second received power of the radio wave, estimate the first received power based on the parameter and a value of the second received power; and calculate a distance to the radio wave emitter, based on the first received power.

7 Claims, 9 Drawing Sheets

ELECTRONIC APPARATUS, WIRELESS RECEPTION METHOD, AND WIRELESS SYSTEM

CROSS REFERENCE TO RELATED APPLICATIONS

This application is based upon and claims the benefit of priority from the prior Japanese Patent Application No. 2017-201161, filed on Oct. 17, 2017, the entire contents of which are incorporated herein by reference.

FIELD

Embodiments described herein relate to an electronic apparatus, a wireless reception method, and a wireless system.

BACKGROUND

With the development of IoT, wireless tags are expected to be used in various scenes. Among them there is a system that allows a wireless receiver to detect the position of a wireless tag.

To allow a single receiver to estimate the position of a tag, it is only required that the direction and distance of the tag can be detected. Methods of measuring the distance to a tag through a single receiver include distance estimation from RSSI (Received Signal Strength Indication). The single receiver receives radio waves from a tag, and estimates the distance using the fact that the attenuation through the channel is a function of the distance on the basis of their intensity, the transmission power of the tag, the attenuation constant of the channel, the antenna gain and the like. Unfortunately, RSSI significantly varies in a multipath environment owing to fading. Accordingly, the estimated distance also significantly varies, and a correct value cannot be obtained.

DETAILED DESCRIPTION

According to one embodiment, a wireless receiver includes reception circuitry and processor circuitry. The reception circuitry receives a radio wave from a radio wave emitter. The processor circuitry estimates a parameter of a ratio of a first received power of a line-of-sight component in the radio wave to a second received power of the radio wave, estimates the first received power based on the parameter and a value of the second received power, and calculates a distance to the radio wave emitter, based on the first received power.

Below, embodiments of the present invention are described with reference to the drawings. In the following embodiments, only parts essentially required for the configuration of the present invention are described. Illustration and description of parts that do not relate to the operation of the present invention are omitted.

Figure 1:
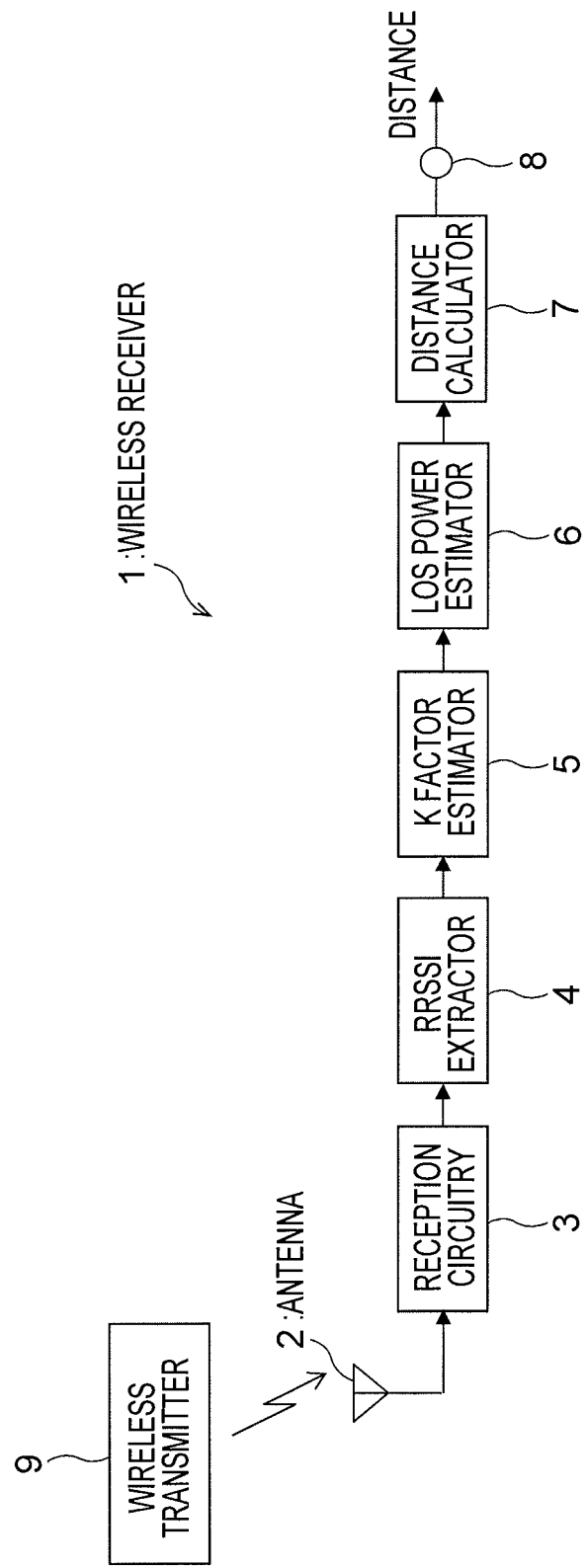
FIG. 1 is a diagram showing a wireless system according to a typical embodiment of the present invention.

FIG. 1 is a diagram showing a wireless system according to a typical embodiment of the present invention. The wireless system in FIG. 1 includes a wireless receiver 1 which is an electronic apparatus, and a wireless transmitter 9 that is an example of radio wave emitter. The wireless receiver 1 includes an antenna 2, reception circuitry 3, an RSSI (Received Signal Strength Indication) extractor 4, a K factor estimator 5, a LOS (line of sight) power estimator 6, a distance calculator 7, and a result output terminal 8.

The elements 3 to 7 may be implemented with software (programs) that operates on a processor, such as a CPU (Central Processing Unit), or be configured with hardware or circuits, such as FPGAs (Field Programmable Gate Arrays) or ASICs (Application Specific Integrated Circuits), or be configured with a combination thereof. These elements may be configured as a single chip, or configured as chips in a distributed manner.

The wireless receiver 1 receives radio waves transmitted from the wireless transmitter 9. The received electrical signal is subjected to appropriate physical layer-reception processes, such as amplification, filtering, baseband conversion, and A/D conversion (analog-digital conversion), and is subjected to appropriate digital signal and protocol layer processes, such as error detection and correction, and packet reading, as required, in the reception circuitry 3, and then is output. At this time, information output from the reception circuitry 3 is assumed to contain the intensity of the received signal of radio waves through the antenna 2, for example, the RSSI (Received Signal Strength Indication) itself, or information from which the RSSI can be calculated, for example, information pertaining to the amplitude or power of the received signal of radio waves.

The RSSI extractor 4 extracts the RSSI from the information input from the reception circuitry 3, and outputs the RSSI to the K factor estimator 5. The K factor estimator 5 estimates a Rician K factor (hereinafter called a K factor) from variation in RSSI. The K factor is a parameter that quantifies the variation in channel due to multipath. The K factor is a power ratio of a strong one path and weak paths. In many cases, the ratio is a power ratio between the line-of-sight component power (direct waves) and the non-line-of-sight (NLOS) component power (reflected waves). The K factor is an example of a parameter pertaining to the power ratio of the line-of-sight component in the received power.

In a multipath environment, the variation in the amplitude of the received signal has a Rician distribution. The K factor is one of parameters that determine the shape of the Rician distribution.

The Rician distribution is represented as [Formula 1].

$$f(x; v, \sigma) = \frac{x}{\sigma^2} e^{\frac{-(x^2+v^2)}{2\sigma^2}} I_0\left(\frac{xv}{\sigma^2}\right) (x, v \geq 0) \quad \text{[Formula 1]}$$

where "x" is the amplitude, "$v^2$" is the power average value of a strong path, "$2\sigma^2$" is a power total average value of weak paths, and "$I_0$" is a 0-th order first kind modified Bessel function. The K factor is represented as "$v^2/2\sigma^2$", and is the ratio of the power of a strong path and total power of weak paths in the case where the single strong path resides and other many weak paths are combined.

The K factor is often used in modeling of multipath channels, and is used for indicating a channel condition requirement in wireless communication standardizations. In many cases, the K factor can be estimated from radio wave measurement experiment results through measuring instruments.

An example of a K factor estimation method using the variation in reception intensity (the intensity may be a power value or a relative value (RSSI etc.)) is described below.

The amplitude of a reception sample "x(n)" is assumes as "R(n)".

$$R(n)=|x(n)|, n=1, \ldots N. \quad \text{[Formula 2]}$$

The k-th order moment "$\mu_k$" of "R(n)" is calculated.

$$\mu_k = \frac{1}{N}\sum_{n=1}^{N} R^k(n) \quad \text{[Formula 3]}$$

The relational formula between the moment ratio "$f_{1,2}$" and the K factor is described below.

$$f_{1,2} = \frac{\mu_1^2}{\mu_2} \quad \text{[Formula 4]}$$

$$f_{1,2} = \frac{\pi e^{-K}}{4(K+1)}\left[(K+1)I_0\left(\frac{K}{2}\right) + KI_1\left(\frac{K}{2}\right)\right]^2 \quad \text{[Formula 5]}$$

where "$I_m$" is m-th order modified Bessel function.

Based on this relational formula, a correspondence table between "$f_{1,2}$" and "K" is preliminarily created, and is stored in an internal buffer of the K factor estimator 5 or in a storage accessible from the K factor estimator 5. The K factor estimator 5 obtains "K" from the calculated moment ratio using the correspondence table.

The value of the estimated K factor is input into the LOS power estimator 6. The LOS power estimator 6 estimates the power of the line-of-sight component (LOS power) using the input K factor (=$v^2/2\sigma^2$) and the power value of the received signal (received power value). The received power value is obtained by converting the RSSI, for example. Alternatively, the power value may be obtained from the reception circuitry 3. The K factor is a ratio. Accordingly, the K factor can be estimated from a relative value. However, to convert the power into the distance, an absolute power value is required. Accordingly, the LOS power estimator 6 calculates the LOS power value in order to allow the distance calculator 7 on the subsequent stage to calculate the distance.

The line-of-sight component power can be estimated through the following calculation.

Provided that the K factor is "K", the line-of-sight component power is "$p_{rx}$" and the non-line-of-sight component power is "$P_n$", K=$p_{rx}/P_n$. Provided that all the received power (the absolute power value of the received signal) is "$P_{all}$", $P_{all}=P_n+p_{rx}$. According to these two formulas, $p_{rx}=P_{all}*K/(1+K)$ is obtained. Consequently, the line-of-sight component power can be obtained by multiplying all the received power by "K/(1+K)".

At this time, "$P_{all}$" is the received power value of radio waves. The value may be an average power value of waveforms of received signals in the time domain, or the average value of the powers of multiple frequency components contained in the received signals, or may be measured by another method. In a case where frequency hopping is used as the communication scheme, the average value of powers of the received signals obtained in multiple frequencies may be adopted as "$P_{all}$". "$P_{all}$" is a power at a connection point between the antenna 2 and the reception circuitry 3. The antenna gain or the antenna effective area of the wireless receiver 1, the amount of amplification and attenuation in the reception circuitry 3, etc. are assumed to be known, and the LOS power estimator 6 can convert the input received power into the power value at an output terminal of the antenna 2.

Upon receipt of the value of the input line-of-sight component power, the distance calculator 7 estimates the distance to the wireless transmitter 9. At this time, a constant pertaining to the attenuation of the channel (attenuation constant) is used.

A calculation formula of the distance is as follows.

$$R = \left(\frac{P_{tx}\lambda^n G_{rx}}{(4\pi)^2 p_{rx}}\right)^{\frac{1}{m}} \quad \text{[Formula 6]}$$

where "$P_{tx}$" is the transmission power that contains the antenna gain, "$\lambda$" is the wavelength of the radio waves, and "$G_{rx}$" is the antenna gain of the receiver. "m" and "n" are attenuation constants, and are "2" in a free space that includes nothing except the transmitter and the receiver. "R" is the calculated distance.

The calculated power value of the line-of-sight component is used as "$p_{rx}$". The transmission power value that contains the antenna gain of the wireless transmitter is used as "$P_{tx}$". It is assumed that information pertaining to the transmission power (radio wave intensity) of the wireless transmitter 9 has already been known, for example, through notification from the wireless transmitter 9 or through unique determination by the wireless standards.

"m" is sometimes less than "2" under a condition where the channel is closed so as to form a waveguide. However, a value of "2" or more is often used for normal distance estimation from RSSI. In this embodiment, provided that the line-of-sight component power can be correctly obtained, the channel can be approximately assumed as a free space. Accordingly, "2" may be used as "m". In principle, the line-of-sight component arrives with an attenuation constant of "2". Accordingly, if the power value only containing the line-of-sight component is used as "$p_{rx}$", the distance can be highly accurately calculated without any difficult branch condition, such as consideration of the channel environment. Note that under a condition where the non-line-of-sight component power is often mixed into the line-of-sight component power, a value less than "2" may be used as "m".

"λ'"" is a loss component dependent on the wavelength, and is basically due to the antenna effective area. If there is not a loss dependent on the wavelength other than the antenna effective area, "n" may be "2". In a case of reflection of the multipath by a surface, such as of a wall or furniture, the reflection often indicates the larger loss as the wavelength is shorter (the frequency is higher). Accordingly, a value of "2" or more may be used as "n". Note that if the line-of-sight component power can be correctly obtained, "n" may be "2" because the line-of-sight component is not reflected by the wall or the like.

"n" and "m" are not necessarily the same as each other. The theoretical values as described above are not applied to the values of "m" and "n" in many cases. Accordingly, it is preferred that an appropriate value be set through tests if possible.

The distance calculator 7 outputs the value of the thus calculated distance to the result output terminal 8. The result output terminal 8 may be at any position on wiring. In a case where the distance calculator 7 is realized in a software, this terminal may be an interface of software program. Such output of the value of the distance allows the distance to be estimated at higher accuracy than estimation from individual RSSI.

Figure 2:
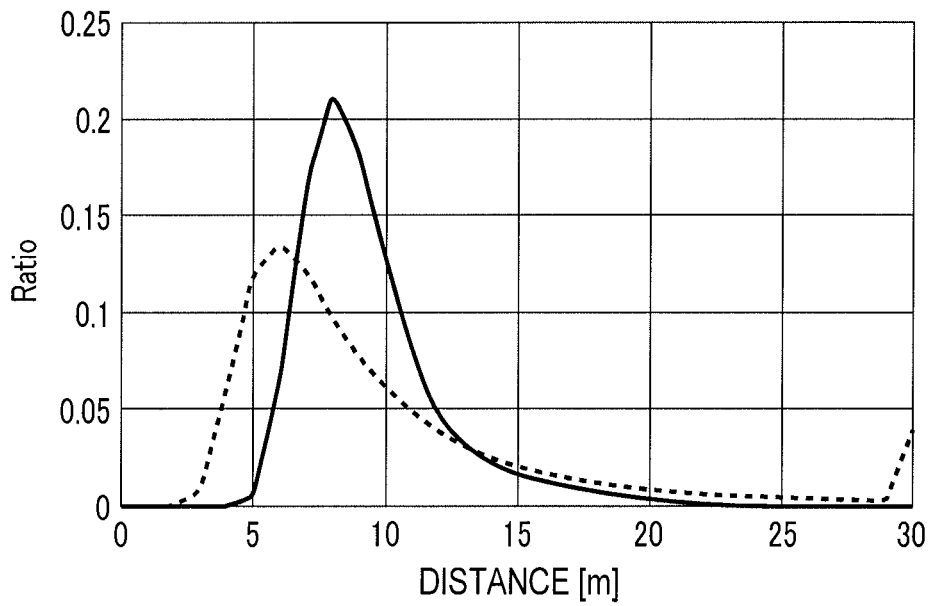
FIG. 2 is a diagram for illustrating advantageous effects of the embodiment of the present invention.

FIG. 2 is a simulation example indicating the advantageous effects of this embodiment. The distance is estimated under a condition where radio waves from a transmitter at a distance of 10 m are received by a single receiver via the multipath channel. A broken line indicates the case of estimation from the individual RSSI. A solid line indicates the case of estimation from the K factor. A histogram of 500,000 trials is converted into a ratio and plotted thereon. The diagram shows that with the most frequent value being on a slightly shorter distance side than 10 m, the case of using the K factor estimation has the distribution narrower than the case of estimation from the individual RSSI, and the value approaches the correct value as a whole. The histogram is obtained from a range to 30 m. Accordingly, the broken line indicating the case of estimation from the individual RSSI rises at a position of 30 m. In actuality, many distances larger than the distance in this case are output. The RMSE (Root Mean Squared Error) in the case of distance estimation from the individual RSSI is 10.2 m. On the other hand, the RMSE in the case of distance estimation from the K factor is 2.8 m, which shows significant improvement.

It has been described that the RSSI is used as the reception intensity of radio waves. Alternatively, another indicator may be used only if the intensity of the received signal of radio waves can be known. The intensity is a function of the power. Any indicator can be used, such as the amplitude, relative power, or dB value, which can be converted into the power with 1:1.

The wireless transmitter in the above description may be replaced with a more general radio wave emitter, such as a home electric appliance that emits electromagnetic noises, for example. The radio wave emitter may be a radar target that does not emit or transmit radio waves by itself but only reflects television radio waves. The wireless receiver may be a passive radar receiver.

The part described as the K factor is not necessarily the K factor itself, and is another parameter that shows what ratio in the power of the received radio waves is the line-of-sight component.

The K factor estimation method having already been described above is a method of estimating the K factor from the power variation of multiple samples. Consequently, in this method, the received signal whose amplitude varies owing to the variation in channel is required to estimate the K factor. Hereinafter, some examples of obtaining received signals whose amplitudes vary.

Figure 3:
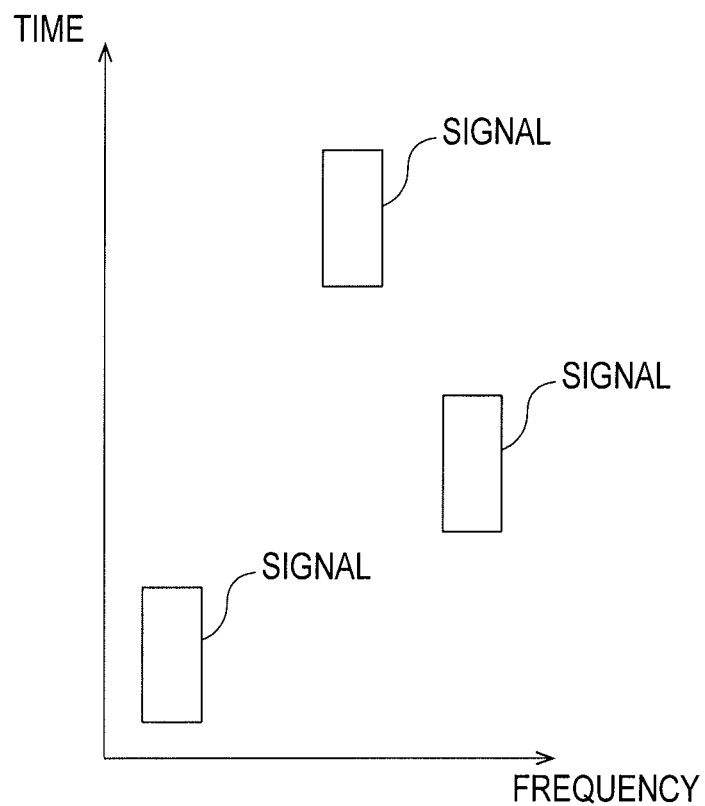
FIG. 3 is a diagram for illustrating one embodiment of the present invention, and is a diagram illustrating frequency hopping.

As shown in FIG. 3, in a first example, the wireless transmitter is a frequency hopping type one, and the wireless receiver receives the signals of multiple hopping frequencies. For example, Bluetooth is a standard that defines frequency hopping. The wireless transmitter transmits in conformity with the standard. According to Bluetooth scheme, a series of transmission in a session can also be performed at the same frequency. In this example, the wireless transmitter transmits signals at multiple frequencies, and the wireless receiver receives these signals on a frequency-by-frequency basis.

Figure 4:
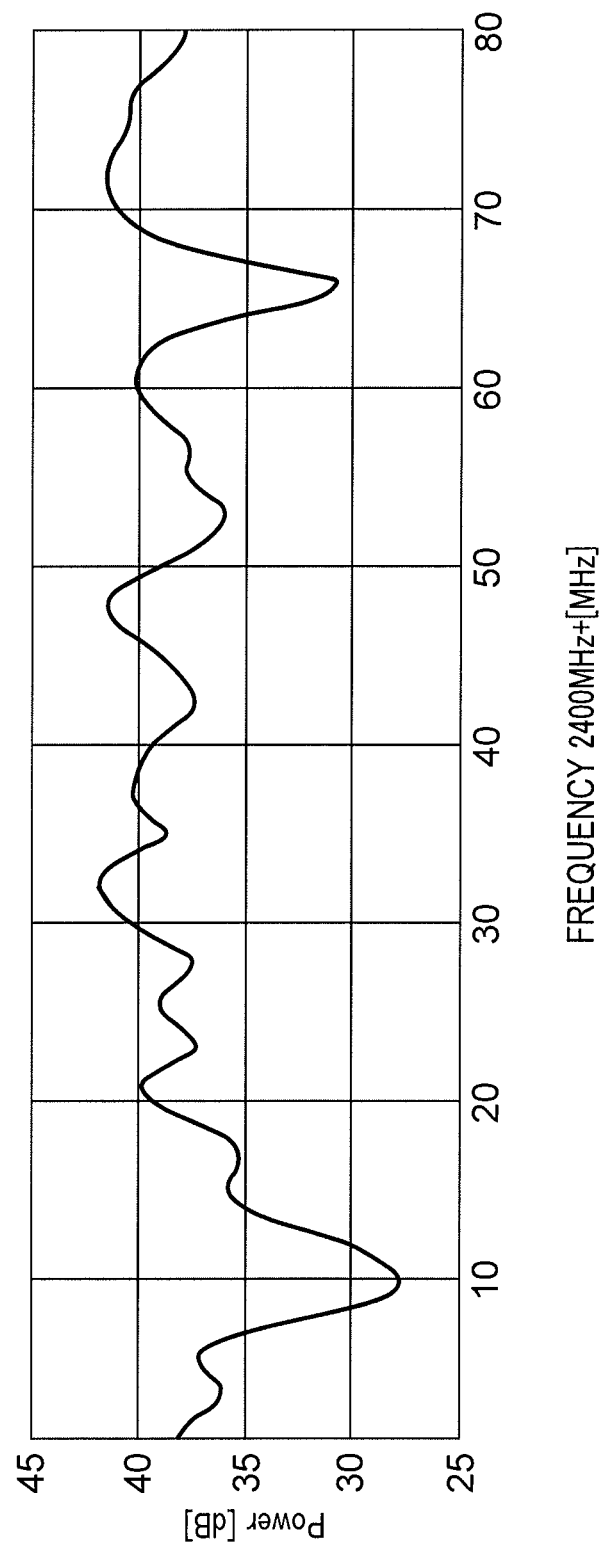
FIG. 4 is a diagram for illustrating frequency selective fading.

In the multipath environment, frequency selective fading occurs. FIG. 4 shows a simulation example of 2.4 GHz-band frequency selective fading. The abscissa axis indicates the frequency. The ordinate axis indicates the received power. The leftmost value on the abscissa axis is 2400 MHz (2.4 GHz). The rightmost value is 2480 MHz (2.48 GHz). This diagram shows the value on the abscissa axis as a relative value with 2400 MHz (2.4 GHz) being adopted as "0". The received power largely varies with respect to the frequency. The amplitude variation forms the Rician distribution. Consequently, as shown in FIG. 3, transmission is performed from the wireless transmitter according to frequency hopping, thereby allowing the wireless receiver to obtain multiple samples of the amplitude that forms the Rician distribution. The K factor can be estimated from the samples according to the method described above.

Use of the frequency-hopping signals as described above allows the K factor estimation to be achieved. Distance estimation from the estimated K factor allows the estimation accuracy of the distance to be improved.

FIG. 3 shows the example of frequency hopping. In a case where the wireless transmitter and the wireless receiver can perform simultaneous transmission and reception at multiple frequencies, signals at multiple frequencies transmitted and received at the same time may be used.

Reception of varying signals may be achieved by changing the channel environment on a transmission-by-transmission basis. For example, the wireless transmitter or the wireless receiver is a mobile unit and moves over a certain extent of a distance, for example, at least a distance of the length of the wavelength of the transmission frequency, during multiple transmissions. This movement allows the configuration or interference state of the multipath to be changed. Alternatively, a reflective object may move in a space where the wireless transmitter and the wireless receiver are present. Accordingly, analogous advantageous effects can be expected with the multipath state change. In a case where the mobile unit moves or the reflective object moves to change the channel environment on a transmission-by-transmission basis, the frequency of each transmission may be the same frequency.

Figure 5:
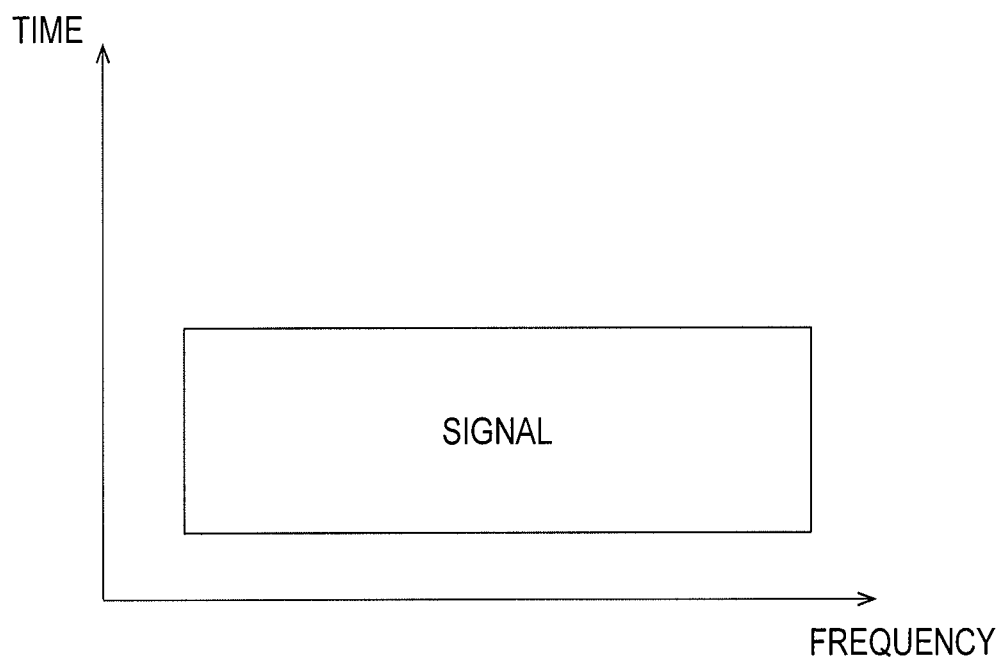
FIG. 5 is a diagram for illustrating one embodiment of the present invention, and is a diagram illustrating an example of a wideband signal.

An embodiment of using a wideband signal is described as a second example with reference to FIG. 5. The wireless transmitter simultaneously transmits a signal (wideband signal) over wide frequencies. The wideband signal suffers different losses on a frequency-by-frequency basis owing to the frequency selective fading. In a case where the spectrum of the transmission signal is relatively flat or the average shape of the transmission signal spectrum is known (a case of a pilot signal, or a case of reception for a long time sufficiently longer than the symbol length), comparison between the transmission signal spectrum and the received signal spectrum allows the amounts of losses at the respective frequencies to be known. The degree of variation in amplitude (power value) can be estimated from the amount of loss at each frequency in the band, and the K factor can be estimated.

Accordingly, even in the case of the wideband signal, the K factor estimation can be achieved. The estimation accuracy of the distance can be improved by distance estimation from the estimated K factor.

In the embodiment described above, the radio waves used for the K factor estimation are radio waves transmitted by the wireless transmitter that is a target of distance measurement. However, there is another method in a case where the wireless receiver is at a fixed location, such as on a wall or ceiling; the method does not use the radio waves of the wireless transmitter that intends to measure the distance, or uses the radio waves of the wireless transmitter while using radio waves received from other wireless transmitters therearound, at this time, to obtain the K factor as a path model of a peripheral space.

Figure 6:
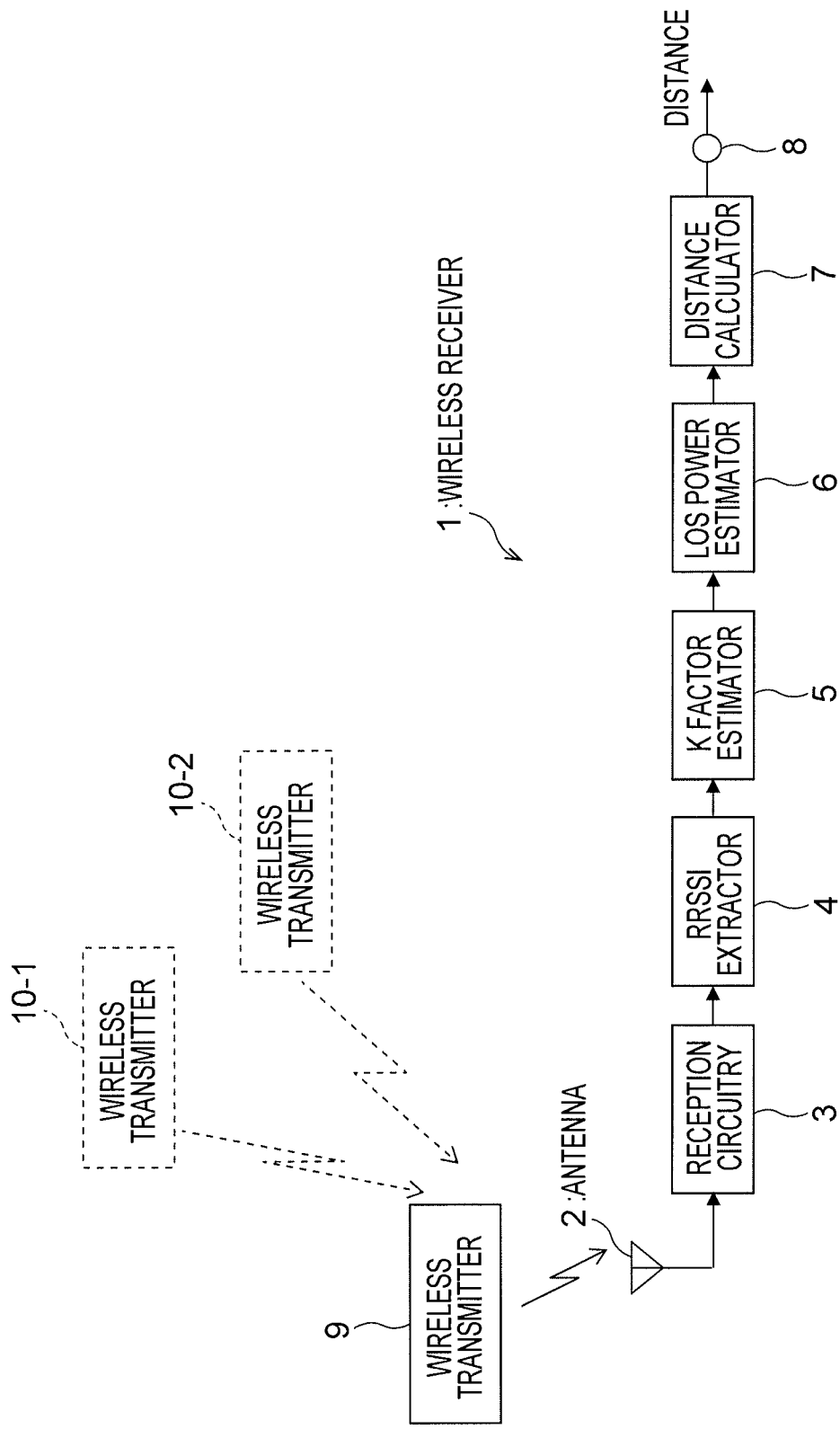
FIG. 6 is a diagram showing one embodiment of the present invention, and is a diagram showing a mode of using radio waves received from another wireless transmitter.
Figure 7:
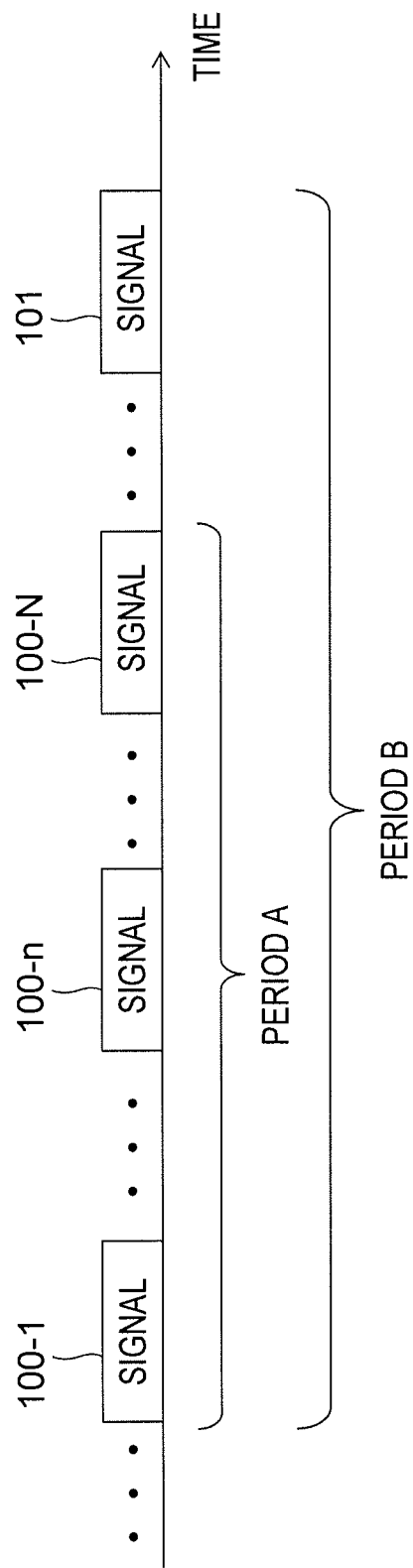
FIG. 7 is a diagram for illustrating an embodiment using radio waves received from another wireless transmitter.

FIGS. 6 and 7 are diagrams for illustrating such an embodiment. In FIG. 6, the wireless transmitter 9 is a terminal that serves as a target of distance measurement by the wireless receiver 1, at the time. The wireless receiver 1 has previously received radio waves from wireless transmitters 10-1 and 10-2 and other multiple wireless transmitters, not shown.

FIG. 7 is a diagram for illustrating the reception timing of signals of radio waves. The signals 100-$n$ (n=1 to N) are signals from other wireless transmitters that include the wireless transmitters 10-1 and 10-2. The signal 101 is a signal from the wireless transmitter 9.

The operation of the wireless receiver 1 is basically the same as that in FIG. 1. However, the K factor is estimated also using information on the power extracted from the signals received from the other wireless transmitters in a past period. Estimation of the line-of-sight power component using the estimated K factor, and calculation of the distance are performed in a manner analogous to that in FIG. 1.

As for the K factor estimation, a sufficiently likely K factor may be preliminarily estimated on the basis of the signals 100-1, . . . , 100-$n$, . . . , 100-N . . . previously received from the other wireless transmitters as indicated by a period A in FIG. 7 and be used for the wireless transmitter 9. The value of the K factor may be updated every time of new reception, or may be periodically updated. When the likelihood of the stored value decreases at the time, the value of the K factor may be updated.

As indicated by a period B in FIG. 7, not only the signals 100-1, . . . , 100-$n$, . . . , 100-N . . . previously received from the other wireless transmitters, but also a signal 101 received from the wireless transmitter 9 that serves as the target of distance estimation may be used.

The wireless transmitters other than the target wireless transmitter of the distance estimation have distances different from each other. Consequently, the received powers are different from each other. Furthermore, the angles of the wireless transmitters with respect to the wireless receiver are different from each other. Accordingly, the wireless transmitter is sometimes at non-line-of-sight location or is sometimes at a significantly near place.

Accordingly, it is preferable that the previously received signals be classified into certain groups on the basis of the similarities of the groups of the powers (or RSSIs etc.) and the K factors. Data (received power etc.) on the signals belonging to the group are used together to estimate the K factor of the group. The similarity may be defined on the basis of the distance in a space where the power and the K factor are adopted as axes, for example. Preferably, a group having a power and K factor close to those of the wireless transmitter whose distance is intended to be estimated is then selected, the data (received power etc.) on the signal belonging to the group is used together, and the K factor is newly estimated. Alternatively, it is preferred that the K factor of the group having already been estimated be used. Accordingly, the K factor in which many samples are reflected can be used. In a case of previously receiving the signals from different wireless transmitters in the same group, the distances and the received powers of these wireless transmitters are not completely identical to each other. Accordingly, it is preferred that in a case where the K factor be estimated using the signals from these wireless transmitters, the powers be normalized so as to have the same average power or estimated line-of-sight component power and then the K factor be estimated.

Figure 8:
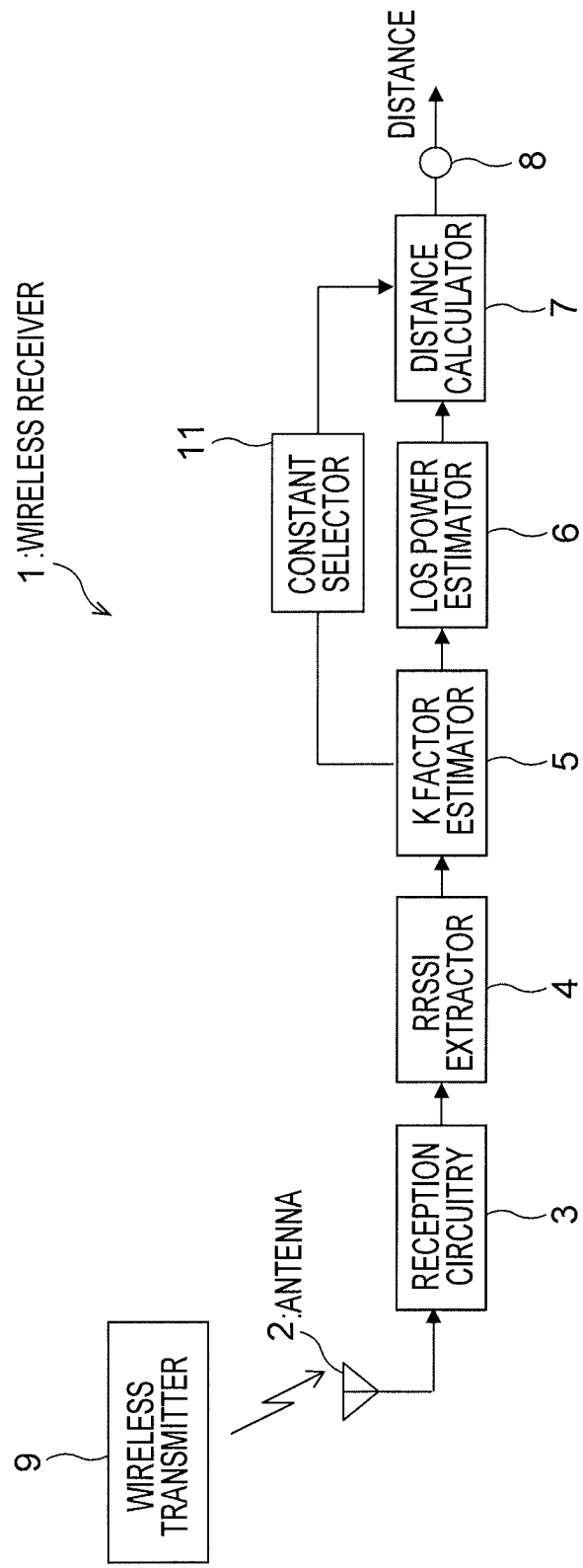
FIG. 8 is a diagram showing one embodiment of the present invention, and a diagram showing a mode of changing the attenuation constant corresponding to the value of a K factor.

FIG. 8 is a diagram for illustrating another embodiment of the present invention. As described above, the estimated K factor largely varies according to the positional relationship between the wireless transmitter and the wireless receiver. Significant reduction in K factor, that is, an increase in the ratio of the non-line-of-sight component power indicates a possibility that there is no line-of-sight component between the wireless transmitter and the wireless receiver, that is, the wireless transmitter is absent in the line of sight. It has been known that the attenuation constant used for estimating the distance from the power largely varies according to the presence or absence of the line-of-sight component.

Accordingly, in this embodiment, the value of the attenuation constant is changed according to the result of the K factor estimation. In FIG. 8, the K factor estimator 5 outputs the estimated value of the K factor to a constant selector 11. The constant selector 11 selects an appropriate attenuation constant according to the K factor value, and outputs the value of the selected attenuation constant to the distance calculator 7. A correspondence table that defines appropriate attenuation constants according to the K factor values is stored in an internal buffer of the constant selector 11 or in a storage accessible from the constant selector 11. The value of the attenuation constant may be determined on the basis of an experiment in an actual environment, if possible.

Preferably, the value of the attenuation constant is switched comparing the K factor value to a threshold, for example. Two or more thresholds may be adopted. The attenuation constant may be finely switched to any of three or more stages. The constant selector 11 may have an algorithm of calculating the attenuation constant as a function of the K factor, instead of comparison with the threshold.

Accordingly, even if an obstacle resides between the wireless transmitter and the wireless receiver and the condition is non-line of sight, a distance closer to an actual distance can be estimated.

If the K factor is significantly low and the wireless transmitter is estimated to be out of the line of sight, data indicating this fact may be output as warning to a subsequent processor of the result output terminal 8. Alternatively, the K factor may be output together with the calculated distance, to the subsequent processor of the result output terminal 8. Although the situation varies according to the usage of the distance by the subsequent processor, for example, in a case where tracking is performed, out-of-tracking due to outliers can be suppressed by not using the values of distances having significantly low K factors.

Figure 9:
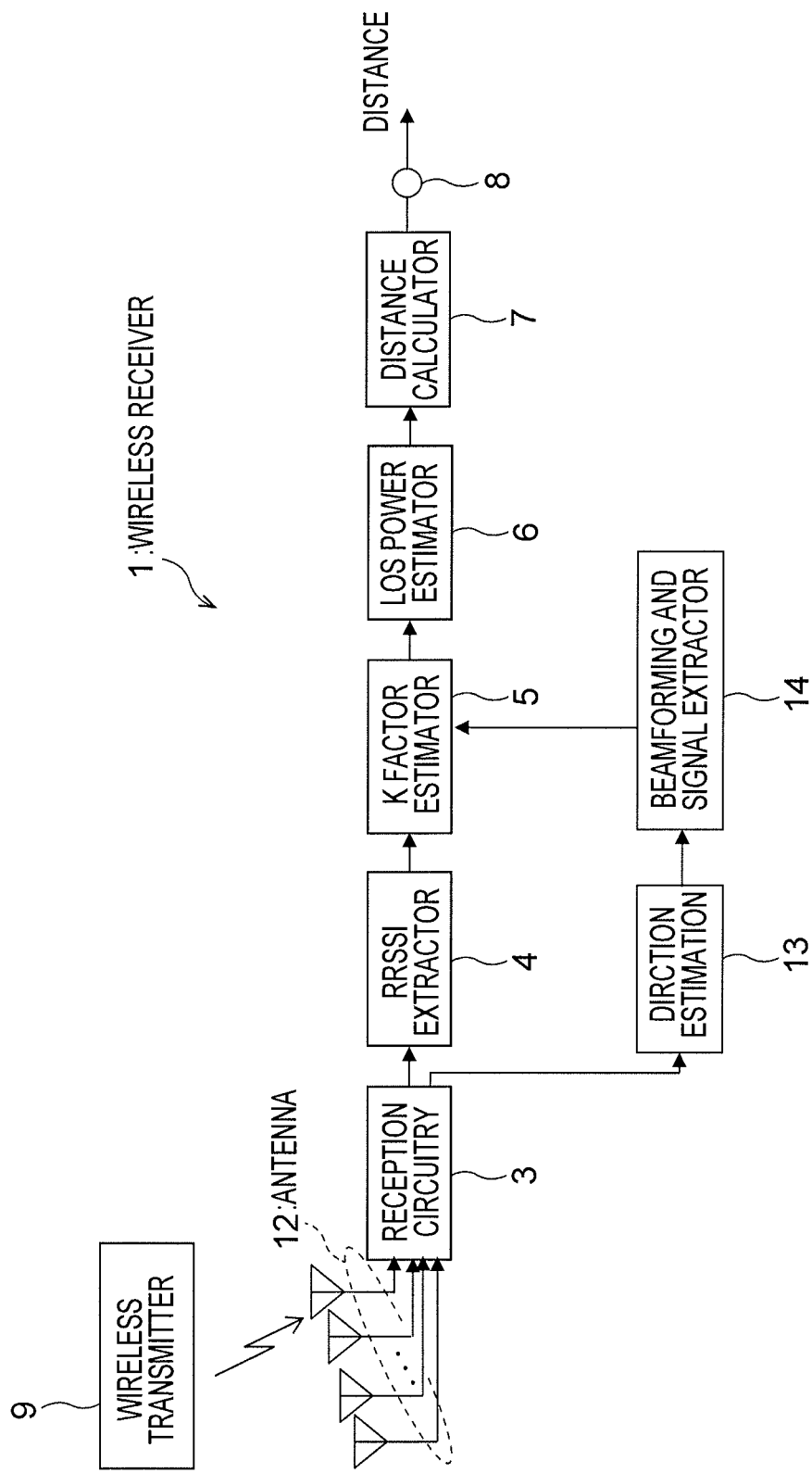
FIG. 9 is a diagram showing one embodiment of the present invention, and is a diagram showing a mode of a wireless receiver including an antenna array.

FIG. 9 is a diagram for illustrating another embodiment of the present invention. The above embodiments have no specific limitation on the antenna configuration of the wireless receiver. In the embodiment in FIG. 9, the wireless receiver 1 includes an antenna array 12. The wireless receiver 1 includes a direction estimator 13, and a beamforming and signal extractor 14.

The antenna array 12 includes a plurality of antenna elements. The reception circuitry 3 processes signals received by each antenna element of the antenna array 12 in a manner analogous to that in the case of FIG. 1, and outputs the signals to the RSSI extractor 4. The reception circuitry 3 outputs, to the direction estimator 13, the signals received by each antenna element of the antenna array 12.

Estimation of the position of the wireless transmitter 9 by a single wireless receiver requires the direction (angle) and the distance. The antenna array 12 allows the direction estimation. Consequently, the position of the wireless transmitter 9 can be estimated together with the calculation result of the distance. Use of the antenna array 12 allows the K factor to be estimated according to a method different from the methods described above.

The direction estimator 13 processes the received signals from the antenna elements of the antenna array 12, and estimates the direction of the wireless transmitter 9 through the algorithm, such as MUSIC (MUltiple SIgnal Classification), for example. The direction estimator 13 may output the estimated value of the direction to the subsequent processor of the result output terminal 8. The subsequent processor may estimate the position of the wireless transmitter 9 from the estimated direction and the distance calculated by the distance calculator 7.

In the embodiment in FIG. 9, the direction estimator 13 outputs the calculated value of the direction to the beamforming and signal extractor 14. The beamforming and signal extractor 14 uses the signals received by the antenna array 12 and the estimated direction to extract a component arriving in this direction from the received signals through beamforming (e.g., weighting). The calculated component (the component extracted with the beam) is sent to the K factor estimator 5, and is used for K factor estimation.

There are several methods of estimating the K factor from the signal intensity of the component extracted with the beam.

A first method can estimate the K factor from the variation in the signal intensities of the beam-extracted components in multiple samples using the method described above. According to the K factor estimation method described above, in a case where the infinite number of samples is obtained, the larger the values of K factors of a Rician distribution formed by these samples, the higher the estimation accuracy is. Beamforming using the multiple samples removes the power of the non-line-of-sight component outside the beam, and the calculated K factor becomes higher than that in a case without beamforming. Consequently, use of this method can expect a higher K factor estimation accuracy than that in the case without beamforming. In the case of using this method, all the received power "$P_{all}$" used for estimating the line-of-sight power by the LOS power estimator 6 may be assumed as the power of component obtained by beamforming and extraction, and what contains not only the gain of the antenna elements but also the antenna gain due to beamforming as "$G_{rx}$" (see Formula 6) may be used.

A second method increases the antenna array aperture diameter, narrows the beam, and extracts approximately only the line-of-sight component with respect to the beam. The K factor can be calculated by obtaining the ratio between the power extracted with the beam and the power removed by the beam. The power removed by the beam can be calculated by subtracting the power extracted with the beam from the received power, for example. In a case where the beam is sufficiently narrow and a completely only line-of-sight component can be extracted, the power of the beam-extracted component can be used as it is and converted into the distance, without estimation of the K factor. Note that the configuration with the sufficiently narrow beam is unrealistic in view of the array diameter and the number of antennas.

According to a third method, it is assumed that the non-line-of-sight component is randomly arriving in approximately all the directions, and the power of the non-line-of-sight component contained in the beam is estimated from the beam width. The estimated power of the non-line-of-sight component is added to the power of the non-line-of-sight component power removed by the beam, and adopted as the non-line-of-sight component power total value. The non-line-of-sight component power contained in the beam is subtracted from the beam-extracted signal power, and is adopted as the line-of-sight component power. The K factor is estimated from the line-of-sight component power and the non-line-of-sight component power total value. Alternatively, the distance may be directly estimated from the power obtained by subtracting the non-line-of-sight component power estimation value from the beam-extracted signal power.

A fourth method may use DCMP (Directionally Constrained Minimization of Power) as the beamforming scheme. The DCMP is a beamforming scheme that fixes the amplitude of the beam only in a specific direction, and minimizes the beam-extracted power. Provided that the specific direction is the direction of the line-of sight component power of the signal, the signal of the line-of-sight component can be calculated, and the contribution of the power of the non-line-of-sight component arriving in the other directions can be minimized. If the power of the non-line-of-sight component close to the line-of-sight component is small, the power of the line-of-sight component can be calculated at higher accuracy.

In a case where the beam is formed for K factor estimation, the arriving direction estimation is not necessary, direction information may be input from an external device and the beam may be formed in the direction.

Another K factor estimation method using the antenna array may be a method that forms no beam and performs estimation from the variation of the powers of the individual antenna elements. The number of samples used for K factor estimation may be increased using this method together with multiple frequency transmission and/or with multiple times of transmission. The K factor estimation from the variation in power typically uses a significantly large number of samples in order to achieve high accuracy. In the wireless system in operation, the transmission period and the number of packets are limited by the other conditions. Accordingly, the number of samples is small, which often reduces the accuracy. Use of the power of each antenna element can increase the number of samples by the degree corresponding to multiplication of the number of antenna elements. Note that to exert advantageous effects through this embodiment, the antenna aperture diameter is required to be large, and the correlation between antennas is required to be reduced. In the case of using this method, all the received power "$P_{all}$" used during estimation of the line-of-sight power by the LOS power estimator 6 may be the average of the received powers of all the antenna elements.

The reception circuitry 3 does not necessarily process the signals of all the antenna elements simultaneously. For example, according to BLE (Bluetooth Low Energy) standard of the direction measurement through the antenna array, an output port of the antenna array is provided with a switch, and each antenna element of the antenna array is switched by the switch and reception is performed in a time sequence manner. The reception circuitry 3 may be configured such that the antenna element is switched while reception is performed, and the process of a single antenna element is always performed.

Figure 10:
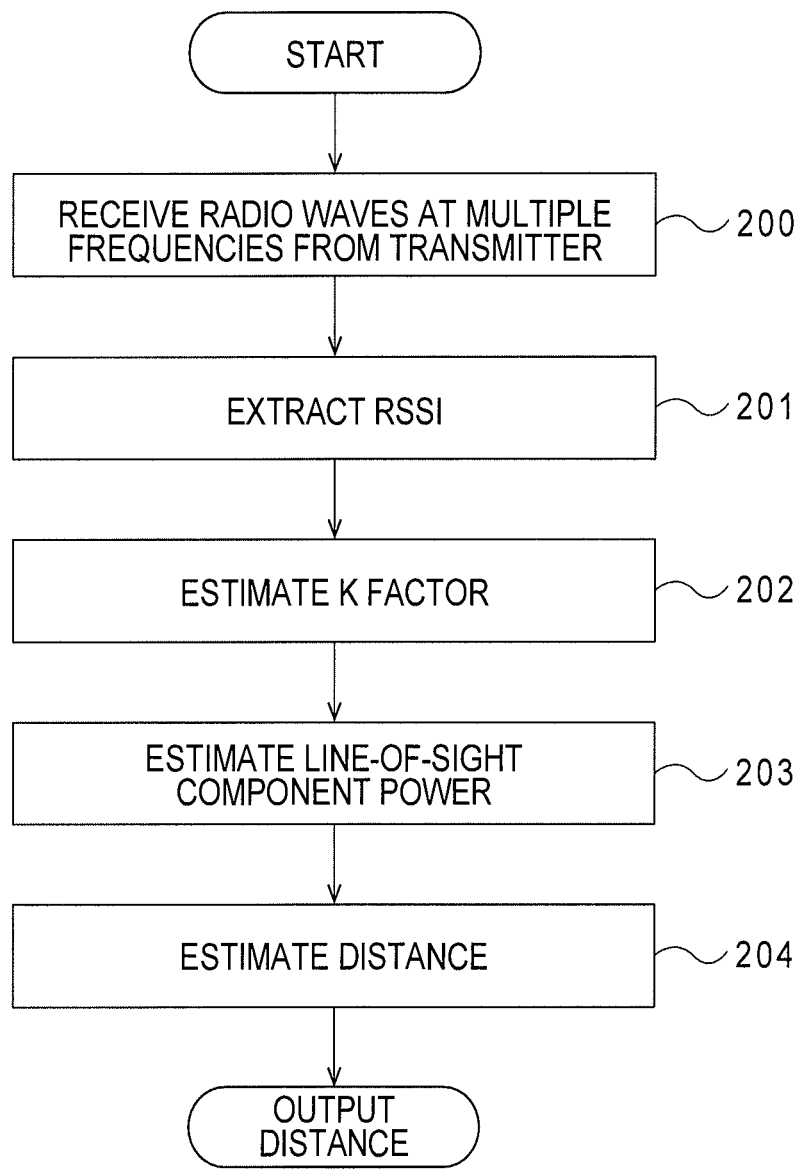
FIG. 10 is a diagram showing one embodiment of the present invention, and is a diagram showing an algorithm of operation of the wireless receiver.

FIG. 10 shows one embodiment of the present invention, and is a flowchart of an algorithm implementing the present invention in a wireless receiver.

The wireless receiver receives radio waves at multiple frequencies from the wireless transmitter (200). Next, the RSSI is calculated from the received power of radio waves received at each frequency (201) The K factor is estimated from the variation in calculated RSSI (202). The line-of-sight component power in the received power is estimated from the received power and the K factor (203). The distance to the wireless transmitter is estimated from the line-of-sight component power (204).

The adverse effect of the variation in received power due to fading can be reduced, and the distance can be estimated at higher accuracy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

The invention claimed is:

1. An electronic apparatus, comprising:
reception circuitry configured to receive a radio wave from a wireless transmitter to calculate a Received Signal Strength Indication (RSSI);
processor circuitry configured to:
estimate a parameter of a ratio of first received power of a line-of-sight component in the radio wave to second received power of the radio wave based on variation in the RSSI owing to variation in channel of the radio wave;
estimate the first received power based on the parameter and a value of the second received power; and
calculate a distance to the wireless transmitter, based on the first received power.

2. The electronic apparatus according to claim 1,
wherein the reception circuitry is configured to receive, from the wireless transmitter, the radio waves emitted at a plurality of frequencies, and
the processor circuitry is configured to estimate the first received power of a line-of-sight component, based on variation in the RSSI at the frequencies.

3. The electronic apparatus according to claim 1,
wherein the processor circuitry is configured to estimate the parameter, based on the RSSI of the radio waves, and on an RSSI of radio waves received from one or more other wireless transmitters up to a time point of reception of the radio waves from the wireless transmitter.

4. The electronic apparatus according to claim 1,
wherein the processor circuitry is configured to
calculate the distance using attenuation constants of channels and the parameter, and
change the value of the constant according to the value of the parameter.

5. The electronic apparatus according to claim 1,
wherein the parameter represents a ratio between the line-of-sight component power and a non-line-of-sight component power.

6. A wireless reception method, comprising:
receiving a radio wave from a wireless transmitter to calculate a Received Signal Strength Indication (RSSI);
estimating a parameter of a ratio of a first received power of a line-of-sight component in the radio wave to a second received power of the radio wave based on variation in the RSSI owing to variation in channel of the radio wave;
estimating the first received power based on the parameter and a value of the second received power; and
calculating a distance to the wireless transmitter, based on the first received power.

7. A wireless system, comprising:
a wireless transmitter configured to transmit a radio wave;
reception circuitry configured to receive the radio wave from the wireless transmitter to calculate a Received Signal Strength Indication (RSSI);
processor circuitry configured to:
estimate a parameter of a ratio of a first received power of a line-of-sight component in the radio wave to a second received power of the radio wave based on variation in the RSSI owing to variation in channel of the radio wave;
estimate the first received power based on the parameter and a value of the second received power; and
calculate a distance to the wireless transmitter, based on the first received power.

* * * * *